July 22, 1958    E. M. BOGAR, JR    2,844,430
SLIDE ASSEMBLY FOR SLIDABLY CONNECTING
RELATIVELY MOVABLE PARTS
Filed Nov. 29, 1956    2 Sheets-Sheet 1
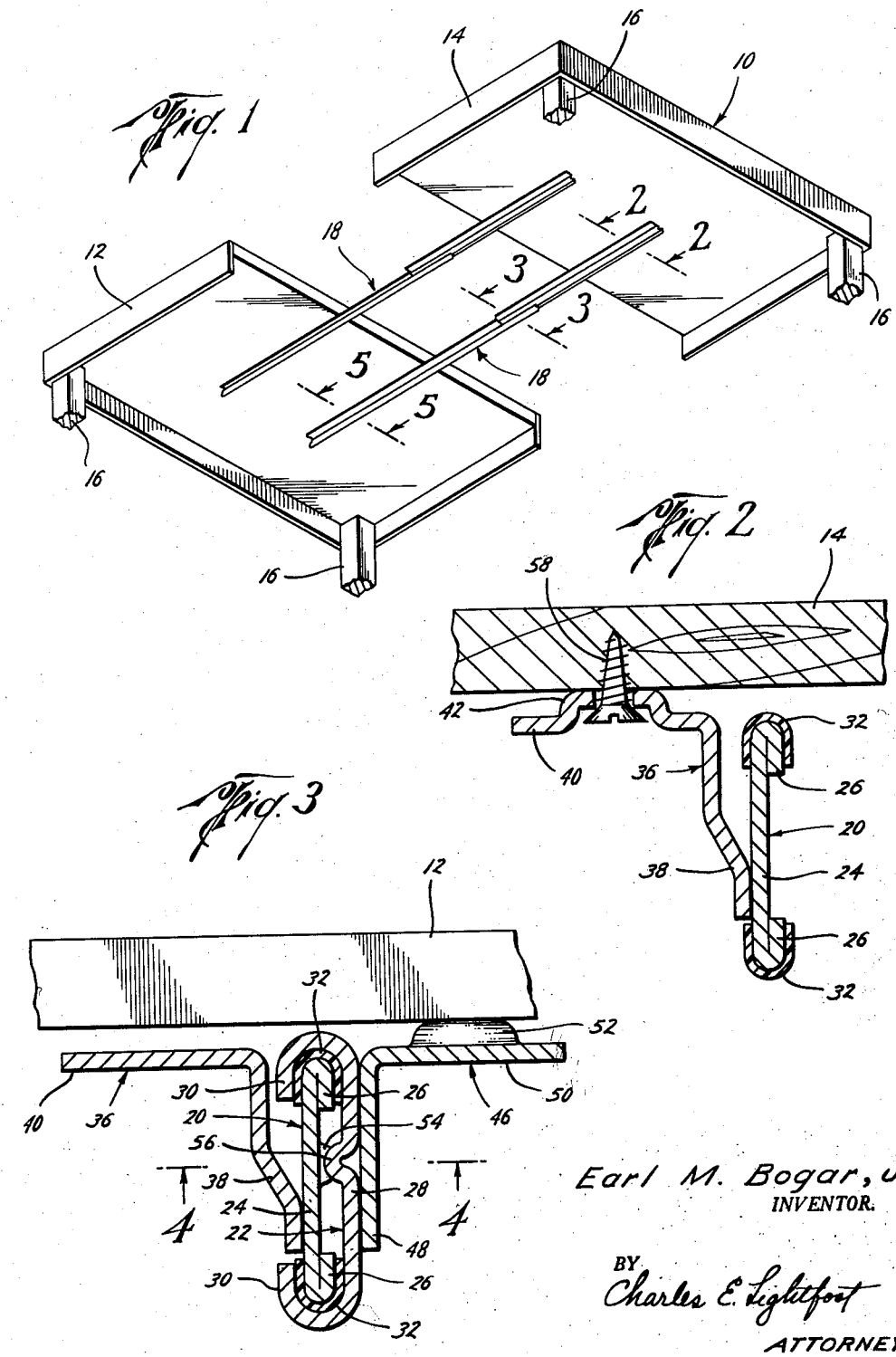
Earl M. Bogar, Jr.
INVENTOR.
BY Charles E. Lightfoot
ATTORNEY July 22, 1958   E. M. BOGAR, JR   2,844,430
SLIDE ASSEMBLY FOR SLIDABLY CONNECTING
RELATIVELY MOVABLE PARTS
Filed Nov. 29, 1956   2 Sheets-Sheet 2
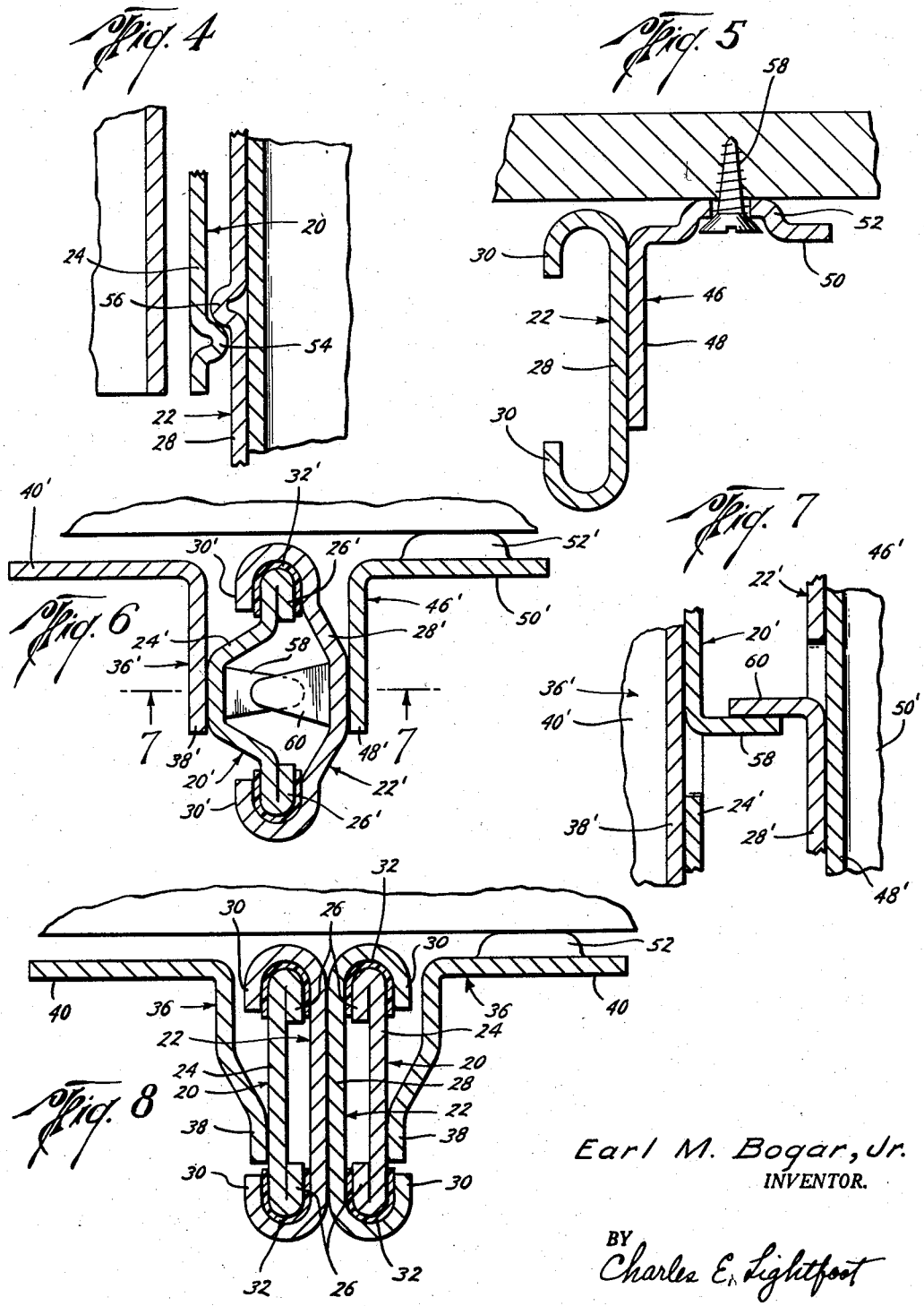
Earl M. Bogar, Jr.
INVENTOR.
BY Charles E. Lightfoot
ATTORNEY

United States Patent Office 2,844,430
Patented July 22, 1958

2,844,430

SLIDE ASSEMBLY FOR SLIDABLY CONNECTING RELATIVELY MOVABLE PARTS

Earl M. Bogar, Jr., Houston, Tex.

Application November 29, 1956, Serial No. 625,101

3 Claims. (Cl. 311—71)

This invention relates to a slide assembly for slidably connecting relatively movable table top members, and more particularly to a metal slide assembly for extension tables.

In the construction of extension tables of the type which are formed in two or more sections adapted to be pulled apart to permit the insertion of separate table leaves in the top whereby the size of the table may be increased, supporting rails or slides each of which is made in two parts slidably interfitted for relative longitudinal sliding movement are usually provided, by which the table sections are connected together and which also serve to support the extra table leaves between the table sections when the table is in extended condition.

Slide assemblies of this kind, as heretofore commonly constructed are subject to the disadvantage that in the absence of special bearing means between the sliding parts the frictional engagement of the parts makes it difficult to extend or retract the table sections, and the employment of antifriction bearings between the sliding parts, such as ball or roller bearings greatly increases the cost of manufacture.

The present invention has for an important object the provision of a slide assembly of the kind mentioned wherein loose play between the slidable elements is substantially eliminated without unduly increasing the frictional resistance of the assembly to extension and retraction.

Another object of the invention is to provide a slide assembly for slideably connecting relatively movable members, embodying bearing means between the slideable parts whereby loose play or wobbling of the assembly is sustantially eliminated while at the same time the friction between the parts is greatly reduced.

A further object of the invention is the provision of a slide assembly of the type referred to formed of inner and outer telescopingly interengaged elements which are longitudinally slideable relative to each other and having wear and friction reducing means therebetween throughout substantially the entire interengageable portions of the elements, whereby sliding movement between the elements of the assembly is facilitated while at the same time the elements are securely held in axially aligned relation.

Another object of the invention is to provide a slide assembly of the kind mentioned which is of simple design and rugged construction and which is also of economical manufacture.

The above and other important objects and advantages of the invention may best be understood from the following detailed description, constituting a specification of the same, when considered in conjunction with the annexed drawings, wherein—

Figure 1 is a fragmentary perspective view of an extension table seen from below, showing the invention applied to the table sections and illustrating the manner in which the invention is operated;

Figure 2 is a cross-sectional view on an enlarged scale, taken along the line 2—2 of Figure 1, looking in the direction indicated by the arrows;

Figure 3 is a cross-sectional view, on an enlarged scale, taken along the line 3—3 of Figure 1, looking in the direction indicated by the arrows;

Figure 4 is a fragmentary cross-sectional view, on an enlarged scale, taken along the line 4—4 of Figure 3;

Figure 5 is a cross-sectional view on an enlarged scale, similar to Figure 2, taken along the line 5—5 of Figure 1, looking in the direction indicated by the arrows;

Figure 6 is a view similar to that of Figure 3, illustrating a somewhat different form of the invention;

Figure 7 is a cross-sectional view, taken along the line 7—7 of Figure 6, looking in the direction indicated by the arrows; and, Figure 8 is a cross-sectional view similar to that of Figure 6 illustrating a still further modification of the invention.

Referring now to the drawings in greater detail, the invention is illustrated herein in connection with its application as a slidable connecting means for the sections of an extension table. It will be understood, however, that the slide assembly of the invention is capable of use for other purposes than that illustrated and that it is intended as a means for slidably connecting together relatively movable members of various kinds whether such members are parts of articles of furniture or of other extensible structures.

In the drawings an extension table of usual construction is generally indicated at 10, whose top is formed in two separable sections 12 and 14 each provided with legs such as those indicated at 16. The table sections 12 and 14 are connected together for extension and retraction relative to each other by slide assemblies, generally indicated at 18, each of which is formed of two elongated telescopingly arranged parts slideable longitudinally relative to each other.

Each of the slide assemblies 18 has an inner elongated member or part 20 of generally channel shape in cross-section which is telescopingly fitted into an outer elongated member or part 22 also of generally channel shape in cross-section, the members being slideable longitudinally relative to each other. The members 20 and 22 are preferably formed of sheet metal, the member 20 having a central web 24 and inturned marginal flanges 26 overlying the web at the same side thereof and forming thickened marginal portions on the web, and the member 22 having a central web 28 formed with inturned marginal flanges 30 which overlie the web 28 in spaced relation thereto to form trackways of generally U-shape in cross-section within which the thickened marginal portions 26 of the member 20 are slideably received.

In order to reduce the wear on the members and to provide anti-friction means to facilitate the longitudinal sliding movement of the same, the inner member 20 has elongated bearing elements or caps 32 positioned over the thickened marginal portions 26 and extending throughout a substantial portion of the length of the inner member in position to extend between said thickened portions and the U-shaped marginal portions of the member 28, said caps being of a thickness to substantially fill the space between the marginal portions 26 and 30 to form a smooth bearing between the members. The caps 32 may be formed of suitable material, such as nylon or the like, possessing wear resistant and anti-friction properties which particularly adapt it for the purpose. By this construction the members of the slide assembly are securely held against wobbling or loose play while at the same time being easily slideable longitudinally relative to each other.

For the purpose of attaching the assemblies to the under surface of the table sections 12 and 14 whereby the sections will be connected together in a manner to permit the sections to be extended and retracted, each member 20 has an attaching bracket 34 of generally angle shape in cross-section, one flange 38 of which is disposed generally vertically and attached to the web 24 on the opposite side to the inturned marginal flanges 36 thereof, and whose other flange 40 extends laterally, substantially horizontally away from the web.

The bracket 34 may extend throughout the length of the member 20 and is preferably provided for a portion of its length with a number of perforated indentations or dimples 42 which are positioned for engagement with the under surface of one of the table sections to space the slide assembly from the table section, the remaining length of the bracket which underlies the other table section when the sections are in retracted position being without such indentations or dimples. The vertical flange 38 of the bracket 36 has a portion 44, which is laterally offset from the web 24 of the member 20 to space the same somewhat away from the web so that the upper one of the flanges 30 of the member 22 may extend between the vertical flange and the web 24 without binding, as seen in Figure 3.

An attaching bracket 46, of angle shape in cross-section is also provided for the member 22, which bracket has a vertically disposed flange 48 attached to the web 28 and a horizontal flange 50 which is provided throughout a portion of its length underlying one table section with indentations or dimples 52 similar to the dimples 42 of the bracket 36 and for a like purpose. The flange 50 in the area where it underlies the under surface of the other table section is without the dimples or indentations 52.

For the purpose of limiting the relative longitudinal sliding movement of the members 20 and 22 of each slide assembly, whereby the members are prevented from being completely separated when the table sections are moved to extended positions the webs 24 and 28 may be provided with dimples or struck out portions, such as those indicated at 54 and 56, respectively, which are positioned for engagement when the members have been moved longitudinally relative to each other a predetermined distance in a direction to extend the members. The dimples or struck out portions 54 and 56, thus act as stops to prevent the withdrawal of the inner member from the outer member upon extension of the table sections.

In applying the slide assemblies to the table sections the assemblies are disposed in parallel, laterally spaced relation, as illustrated in Figure 1, beneath the table sections the flange 40 of one assembly being positioned with the dimples 42 thereof in contact with the under surface of one table section and secured thereto by suitable means, such as the wood screws 58, in the manner shown in Figure 2, while the portion of the flange 40 underlying the other table section is not so secured. The flange 50 is then positioned with the dimples 52 in contact with the undersurface of said other table section and secured thereto by wood screws while the portion of the flange 50 which underlies said one table section is not so secured. Thus, one flange of each assembly is attached only to one table section, so that the table sections may be separated or extended relative to each other, as seen in Figure 1, until the dimples or struck out portions 54 and 56 are in contact, whereupon further extension of the table sections is prevented. When the table sections are so extended, additional table leaves may be inserted between the sections, in the usual manner, which will be supported on the slide assemblies, to provide an enlarged table top. By removing the additional leaves and moving the table sections toward each other, the table may be retracted, the members 20 and 22 of the assemblies sliding longitudinally of each other until the sections are in engagement.

A somewhat modified form of the invention is illustrated in Figures 6 and 7, of the drawings, wherein the members 20' and 22' of the slide assembly have their webs 24' and 28' outwardly bent away from each other, whereby increased strength is imparted to the assemblies. The inner member 20' in this form of the invention may have a laterally inwardly extending tongue 58 struck out of its web 24' in position to be engaged by a similar tongue 60 struck out of the web 28 of the member 22' to limit relative longitudinal movement of the members in a direction to extend the members, these tongues serving the same purpose as the dimples 54 and 56 of the members 20 and 22 previously described. In other respects the slide assembly of this form of the invention is substantially the same as that previously described and is applied and operated in the same manner.

A further modified form of the invention is illustrated in Figure 8, wherein the slide assembly is made up of two of the outer members 22 placed in back to back relation and secured together, as by means of spot welding or the like to form outwardly opening channels, and two of the inner members 20 which are slidably disposed in the outer members. A bracket 36 is secured to each of the inner members 20 which is constructed as previously described.

In applying the slide assembly of this form of the invention one of the brackets 36 is secured to the under surface of each of the table sections in the manner previously described in connection with the form of the invention illustrated in Figure 2, while the outer members 22 are not secured to the table sections. Thus, upon extension of the table sections the inner members will slide in opposite directions in the outer members. The members of the slide assembly are provided with dimples or stops, not shown, similar to the dimples 54 and 56 in the webs 24 and 28 previously described, whereby the amount of extension of the table sections may be limited. This form of the invention is applied and operates in substantially the same manner as that previously described in connection with the form of the invention illustrated in Figures 1, 2 and 3.

The various parts of the slide assemblies are preferably formed of sheet material, such as sheet steel or the like, having the requisite strength and durability, and which may be secured together in any convenient manner as by spot welding or otherwise.

It will be thus be seen that the invention constructed and applied as described above provides a slide assembly for connecting together parts which are to be moved toward and away from each other and by which such parts are securely connected against wobbling or loose play while at the same time a minimum of resistance to the extension and retraction of the parts is interposed.

The invention has been disclosed herein in connection with certain specific embodiments of the same, but it will be understood that these are intended by way of illustration only, and that numerous changes can be made in the construction and arrangement of the parts without departing from the spirit of the invention or the scope of the appended claims.

Having thus clearly shown and described the invention, what is claimed as new and desired to secure by Letters Patent is—

1. A slide assembly for slidably connecting relatively movable table top parts comprising inner and outer, telescopingly arranged, channel shaped members longitudinally slidable relative to each other, each of said members having a central web and curved marginal portions of U-shape in cross-section, said marginal portions of one of said members being slidably interfitted with said marginal portions of the other of said members, means for securing one of said members to one of said parts and the other of said members to another of said parts and anti-friction means of U-shape in cross-section disposed between and in engagement with the exterior of said marginal portions of said inner part and the interior of said marginal portions of said outer part.

2. A slide assembly for slidably connecting relatively movable table top parts comprising inner and outer, telescopingly arranged, channel shaped members longitudinally slidable relative to each other, each of said members having a central web and curved marginal portions of U-shape in cross-section, said marginal portions of one of said members being slidably interfitted with said marginal portions of the other of said members, anti-friction elements of U-shape in cross-section disposed between and in sliding engagement with the exterior of said marginal portions of the inner part and with the interior of said marginal portions of the outer part, elements of angle shape connected to the webs of each of said members, each of said elements having a flange disposed in parallel relation and in a plane substantially at right angles to the plane of one of said webs and positioned to be secured to one of said parts and means on each of said flanges of said elements positioned for engagement with one of said parts to space the same therefrom.

3. A slide assembly for slidably connecting relatively movable table top parts comprising inner and outer, telescopingly arranged, channel shaped members longitudinally slidable relative to each other, each of said members having a central web and curved marginal portions of U-shape in cross-section, said marginal portions of one of said members being slidably interfitted with said marginal portions of the other of said members, anti-friction elements of U-shape in cross-section disposed between and in sliding engagement with the exterior of said marginal portions of said inner part and with the interior of said marginal portions of said outer part, means for securing one of said members to one of said parts and the other of said members to the other of said parts, and means on said webs positioned for engagement to limit the relative longitudinal movement of the members in a direction to extend the members.

References Cited in the file of this patent

UNITED STATES PATENTS

| | | |
|---|---|---|
| 903,638 | Vincent | Nov. 10, 1908 |
| 978,730 | Gaut | Dec. 13, 1910 |
| 1,130,167 | Ingells | Mar. 2, 1915 |
| 1,531,810 | Pelton | Mar. 31, 1925 |
| 2,626,195 | Walters | Jan. 20, 1953 |
| 2,626,844 | Cooper | Jan. 27, 1953 |
| 2,751,269 | Hafekost | June 19, 1956 |
| 2,766,959 | Duncan | Oct. 16, 1956 |